(12) United States Patent
Loewenthal et al.

(10) Patent No.: US 7,980,580 B2
(45) Date of Patent: Jul. 19, 2011

(54) CLAMPING ASSEMBLY

(75) Inventors: Howard L. Loewenthal, Hinckley, OH (US); Daniel M. Hulse, North Olmsted, OH (US)

(73) Assignee: Invacare Corporation, Elyria, OH (US)

( * ) Notice: Subject to any disclaimer, the term of this patent is extended or adjusted under 35 U.S.C. 154(b) by 1105 days.

(21) Appl. No.: 11/581,236

(22) Filed: Oct. 16, 2006

(65) Prior Publication Data

US 2007/0085300 A1    Apr. 19, 2007

Related U.S. Application Data

(60) Provisional application No. 60/727,167, filed on Oct. 14, 2005.

(51) Int. Cl.
*A47C 7/42* (2006.01)

(52) U.S. Cl. ............. 280/304.1; 248/230.1; 297/354.12; 297/440.2

(58) Field of Classification Search ............... 280/250.1, 280/304.1; 297/440.2, 357, 383, 354.12, 297/353; 248/230.1, 226.11
See application file for complete search history.

(56) References Cited

U.S. PATENT DOCUMENTS

| | | | | |
|---|---|---|---|---|
| 1,787,017 A | * | 12/1930 | Paul | .............................. 403/191 |
| 2,491,154 A | * | 12/1949 | Blazey | .......................... 297/376 |
| 5,127,709 A | * | 7/1992 | Rubinstein et al. | ......... 297/440.2 |
| 5,477,747 A | * | 12/1995 | Cheng | ........................... 74/551.1 |
| 5,556,168 A | | 9/1996 | Dinsmoor, III et al. | |
| 5,593,211 A | * | 1/1997 | Jay et al. | ....................... 297/383 |
| 6,095,611 A | * | 8/2000 | Bar et al. | ................. 297/440.21 |
| 6,257,664 B1 | * | 7/2001 | Chew et al. | ................ 297/284.9 |
| 6,322,145 B1 | | 11/2001 | Melgarejo | |
| 6,733,074 B2 | * | 5/2004 | Groth | .......................... 297/284.4 |
| 7,104,610 B2 | | 9/2006 | Cramer | |
| 7,188,902 B1 | * | 3/2007 | Chen | ............................. 297/357 |
| 2003/0102706 A1 | * | 6/2003 | Float et al. | ................. 297/440.2 |
| 2004/0037639 A1 | * | 2/2004 | Ledingham | ................... 403/400 |
| 2004/0183273 A1 | | 9/2004 | French | |
| 2005/0116525 A1 | | 6/2005 | Holcolm et al. | |
| 2005/0121964 A1 | | 6/2005 | Holcolm et al. | |
| 2008/0157581 A1 | * | 7/2008 | Whelan et al. | ............. 297/440.2 |

FOREIGN PATENT DOCUMENTS

WO    WO 95/35053    12/1995

* cited by examiner

*Primary Examiner* — Anne Marie M Boehler (74) *Attorney, Agent, or Firm* — Calfee, Halter & Griswold LLP (57) ABSTRACT

The present application discloses several embodiments of clamping devices and quick connect attachment devices. In one embodiment, a clamping device includes two wedge members that are forced together to engage a frame component. In another embodiment, a quick connect attachment or latching assembly includes components that slide together and are then fixed, by moving a protrusion into a recess.

27 Claims, 9 Drawing Sheets

CLAMPING ASSEMBLY

PRIORITY CLAIM

This detailed description claims priority from U.S. Provisional Patent Application Ser. No. 60/727,167 filed on Oct. 14, 2005 for ADJUSTABLE SEATING ASSEMBLY FOR USE WITH WHEELCHAIRS, the entire disclosure of which is fully incorporated herein by reference.

TECHNICAL FIELD

This detailed description relates generally to a clamping device useful for clamping items of various shapes and sizes.

BACKGROUND OF THE INVENTION

Wheelchairs are a means of transportation for a significant portion of society. Some wheelchairs include adjustable and/or removable seating systems. The adjustability and/or removability of such seating systems allow a user of the wheelchair to adjust various aspects of the seating system in order to position components of the seating assembly for the support of the user, easily assemble and disassemble the wheelchair, and/or install various seating assembly components onto the wheelchair.

BACKGROUND OF THE INVENTION

Wheelchairs are a means of transportation for a significant portion of society. Some wheelchairs include adjustable and/or removable seating systems. The adjustability and/or removability of such seating systems allow a user of the wheelchair to adjust various aspects of the seating system in order to position components of the seating assembly for the support of the user, easily assemble and disassemble the wheelchair, and/or install various seating assembly components onto the wheelchair.

SUMMARY

The present application discloses several embodiments of clamping devices and quick connect attachment devices. In one embodiment, a clamping device includes two wedge members that are forced together to engage a frame component. In another embodiment, a quick connect attachment or latching assembly includes components that slide together and are then fixed, by moving a protrusion into a recess.

DETAILED DESCRIPTION OF THE INVENTION

This detailed description relates to a clamping device for use in clamping together assorted parts of various shapes and sizes and, in particular, to various embodiments of adjustable and/or removable wheelchair seating assemblies and to various embodiments of clamping devices for use therewith. This detailed description is applicable to clamping devices and wheelchair seating assemblies of varying construction.

Figure 1:
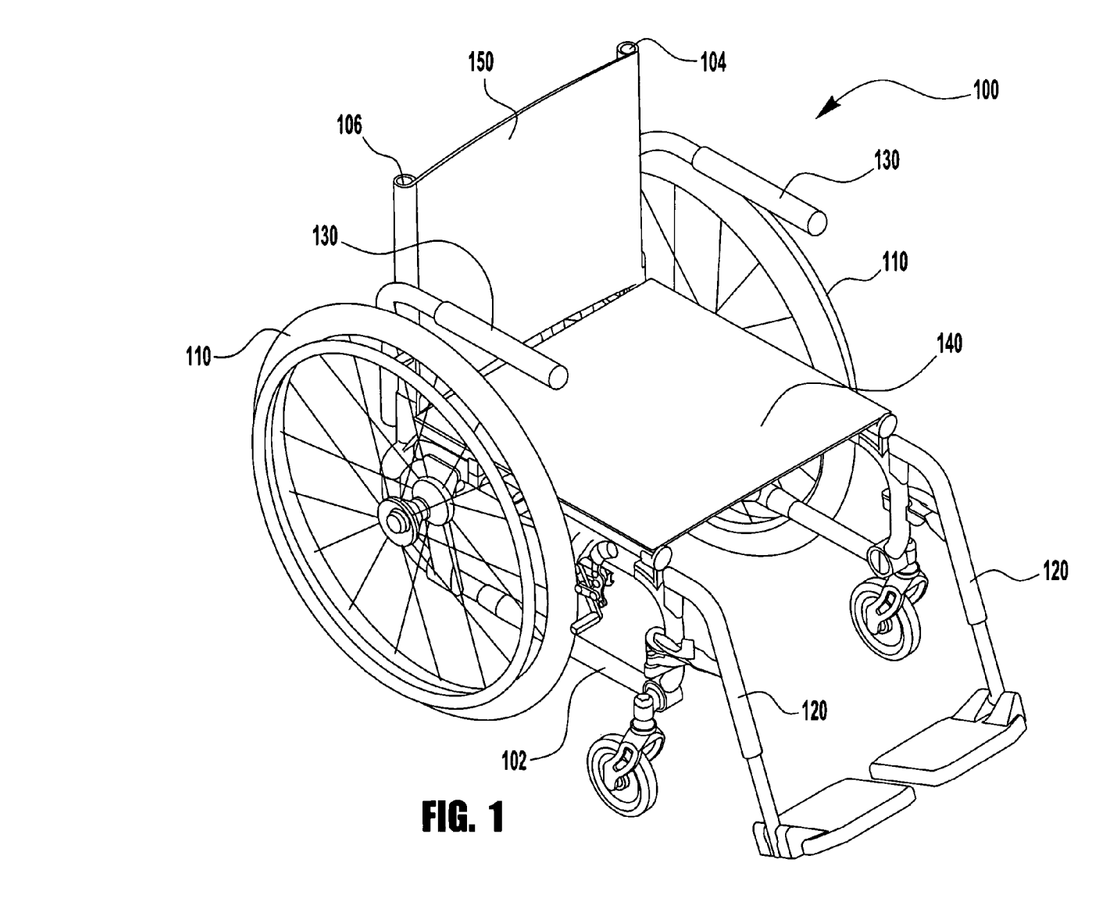
FIG. 1 is a perspective view of an exemplary wheelchair.

Referring to FIG. 1, a perspective view of an exemplary wheelchair 100 is shown. The wheelchair 100 has a frame 102 that includes a first side cane 104 and a second side cane 106. For the purpose of this application a frame 102 is any tubular or cylindrical (including frame components with circular, elliptical, or oval cross sections) member that defines some structural aspect of a wheelchair. The frame 102 can take a wide variety of different shapes and configurations. The frame 102 of the exemplary wheelchair illustrated in FIG. 1 is fashioned from metal, but other suitable materials such as plastic or a composite material could also be used. The wheelchair illustrated in FIG. 1 also includes a pair of wheels 110, a pair of optional leg rests 120, a pair of optional arm rests 130, a seat bottom 140 and a backrest 150.

Figure 2:
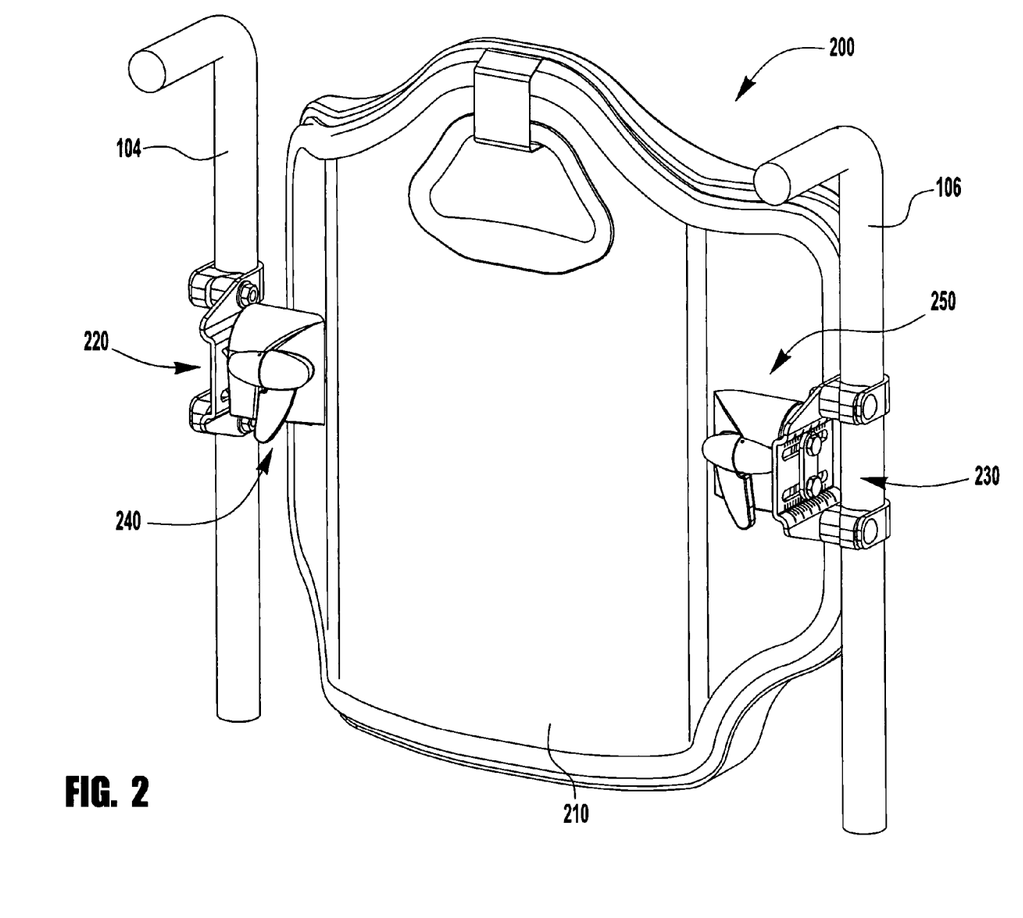
FIG. 2 is a perspective view of one embodiment of a seating assembly component.

Referring now to FIG. 2, a perspective view of an exemplary wheelchair seating assembly component 200 is shown. The embodiment of the wheelchair seating assembly component 200 illustrated in FIG. 2 can be utilized with the exemplary wheelchair 100 shown in FIG. 1. However, it should be understood that wheelchair seating assembly component 200 of this detailed description is not limited to use with the exemplary wheelchair 100 illustrated in FIG. 1. The wheelchair seating assembly component 200 disclosed by this detailed description can be used with any type of wheelchair, including but not limited to, manually driven wheelchairs, motor driven wheelchairs, wheelchairs with rigid frames, wheelchairs with folding frames, scooters, rollators, and other mobility aids. In addition, the wheelchair seating assembly component 200 disclosed by this detailed description can also be used for other devices apart from wheelchairs.

The wheelchair seating assembly component 200 illustrated in FIG. 2 includes a backrest 210. While the wheelchair seating assembly component 200 illustrated in FIG. 2 only includes a backrest 210, additional embodiments of the wheelchair seating assembly component provide an entire seat including a seat bottom or a seat bottom alone without a backrest. The wheelchair seating assembly component 200 illustrated in FIG. 2 provides for adjustment of the vertical position of the backrest 210, the adjustment of the horizontal position of the backrest between a fore and an aft position (or distance from the wheelchair side canes 104, 106), and the adjustment of the angular orientation of the backrest relative to the wheelchair side canes 104, 106. It should also be understood by those skilled in the art that the location of the left side and right side of the backrest 210 (i.e. as viewed in FIG. 2) relative to each of the side canes 104, 106 may be adjusted independently. This ability to adjust the location of the left and right side of the backrest independently allows for adjustment of the backrest to correct for discrepancies in the user's spinal structure or other physical features. This feature also ensures that the backrest can be properly positioned even if the side canes 104, 106 are not parallel with one another. The embodiment illustrated in FIG. 2 also provides for the removal of the wheelchair backrest from the frame of the wheelchair. However, in other embodiments of the wheelchair seating assembly component 200 the wheelchair seating assembly component provides for additional or fewer adjustments of the backrest. In addition, other embodiments of the wheelchair seating assembly component 200 do not provide for the removal of the backrest.

The wheelchair seating assembly component 200 of the embodiment illustrated in FIG. 2 generally includes a pair of mounting/adjustment assemblies 220 and 230 which are mounted to the side canes 104, 106 of the wheelchair 100. The embodiment of the mounting/adjustment assemblies 220 illustrated in FIG. 3 generally include a pair of wedge members 330, 340 that clamp the mounting/adjustment assemblies 220, 230 onto wheelchair side canes 104 and 106 having a range of diameter sizes.

The wheelchair seating assembly component 200 of the embodiment illustrated in FIG. 2 also generally includes a pair of latching assemblies 240, 250 for the attachment of the backrest 210 to the mounting/adjustment assemblies 220, 230 that are mounted onto the side canes 104, 106. The latching assemblies 240, 250 of the embodiment of the wheelchair seating assembly component 200 illustrated in FIG. 2 thereby provide for the selective attachment and removal of the backrest 210 to and from the side canes 104, 106. Once the backrest 210 is attached to the mounting/adjustment assemblies 220, 230, the mounting adjustment assemblies 220, 230 provide for the adjustment of the backrest 210.

The mounting/adjustment assemblies 220 and 230 are mirror constructions of each other in the exemplary embodiment and, therefore, only mounting/adjustment assembly 220 will be discussed in particular. It should be understood that additional embodiments of the wheelchair seating assembly component 200 include more or less than two mounting/adjustment assemblies and the wheelchair seating assembly component of this detailed description is not limited to a pair of mounting adjustment assemblies.

Figure 3:
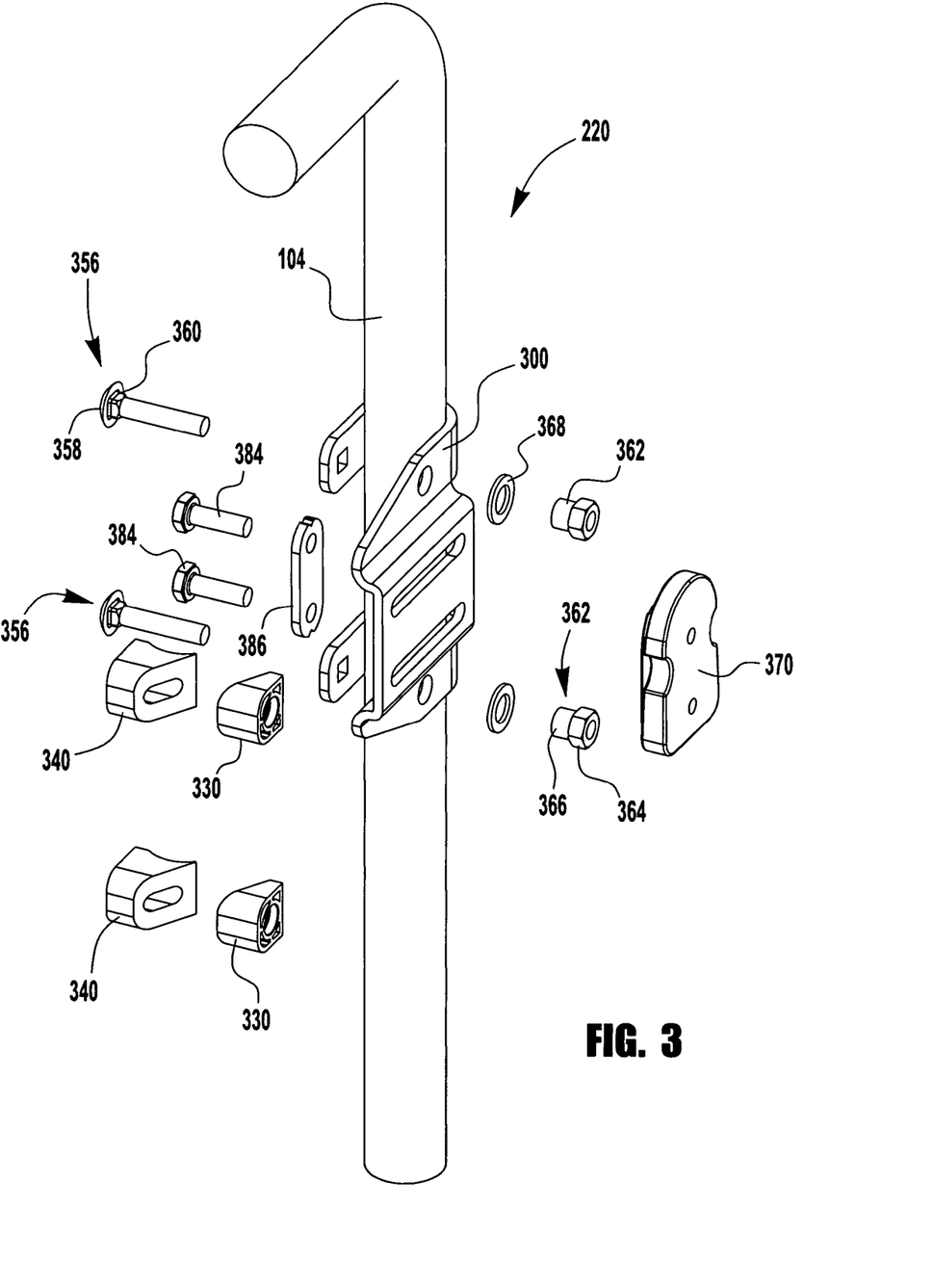
FIG. 3 is an exploded perspective view of a mounting/adjustment assembly of the embodiment of the seating assembly component illustrated in FIG. 2.

Referring now to FIG. 3, a perspective view of an exemplary mounting/adjustment assembly 220 is shown. The mounting/adjustment assembly 220 of the embodiment illustrated in FIG. 3 includes a frame bracket 300 which partially surrounds the side cane 104. The frame bracket 300 can take a wide variety of different shapes and configurations. The frame bracket 300 of the embodiment illustrated in FIG. 4 has upper and lower frame mounting portions 410, 412. The frame mounting portions 410, 412 of the frame bracket 300 of the embodiment illustrated in FIG. 4 both have a generally "J" shaped profile when viewed from the top, i.e. the top of FIG. 4, with generally planar leg portions 416, 418 and frame retaining portions 420, 422 which have a generally "U" shaped profile. Examples of other shapes that can be used for the frame mounting portions 410, 412 of the frame bracket 300 include, but are not limited to, U-shaped, a portion of a square, a portion of a rectangle, a portion of a triangle, a portion of an oval or circle, irregular shape, etc. It should be understood that the frame bracket 300 of this detailed description is not limited to a pair of frame mounting portions and that any number of frame mounting portions can be used, including a single frame mounting portion.

Figure 4:
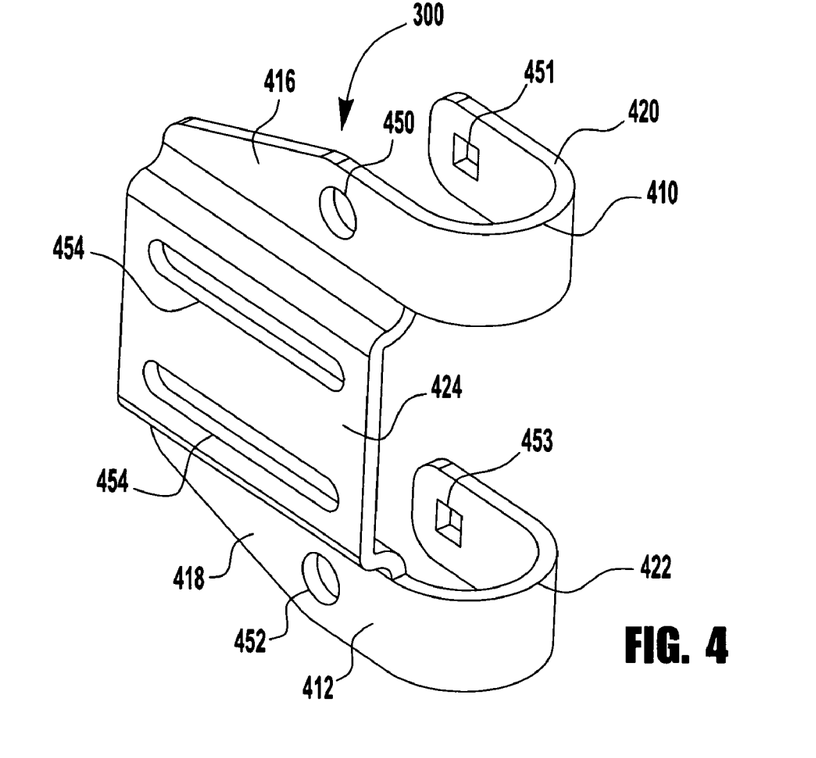
FIG. 4 is a perspective view of a frame bracket of the embodiment of the mounting/adjustment assembly illustrated in FIG. 3.
Figure 5A:
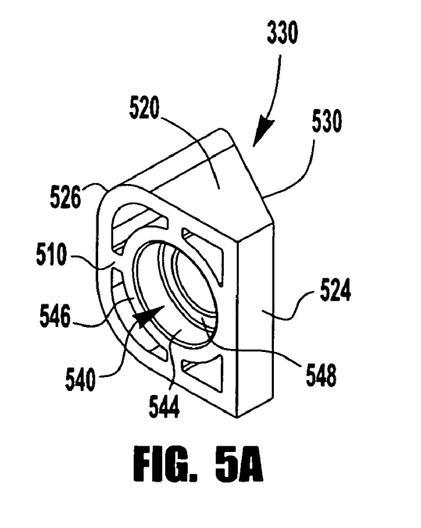
FIG. 5A is a bottom perspective view of a first wedge member of the embodiment of the mounting/adjustment assembly illustrated in FIG. 3.
Figure 5B:
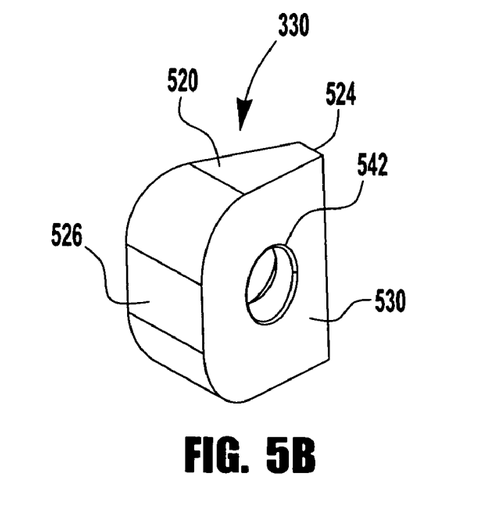
FIG. 5B is a top perspective view of the first wedge member of the embodiment of the mounting/adjustment assembly illustrated in FIG. 3.
Figure 5C:
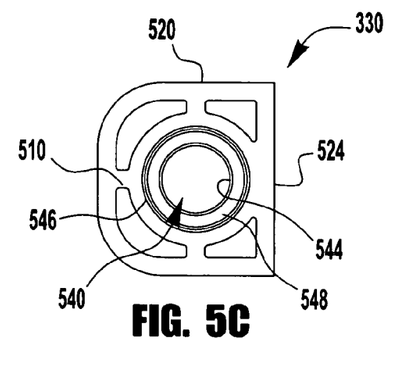
FIG. 5C is a side plan view of the first wedge member of the embodiment of the mounting/adjustment assembly illustrated in FIG. 3.
Figure 5D:
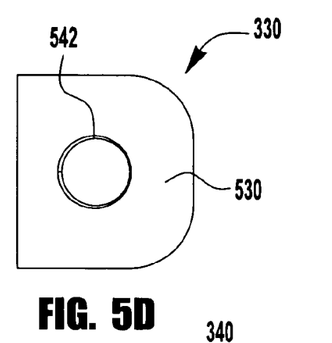
FIG. 5D is a top plan view of the first wedge member of the embodiment of the mounting/adjustment assembly illustrated in FIG. 3.
Figure 6A:
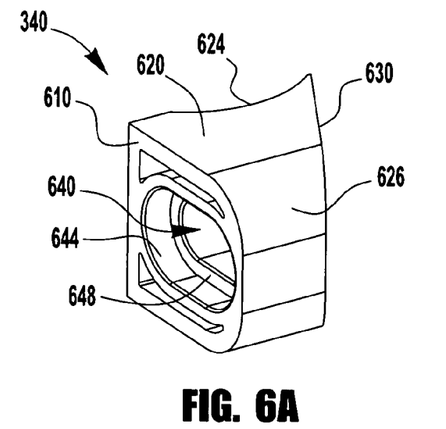
FIG. 6A is a bottom perspective view of a second wedge member of the embodiment of the mounting/adjustment assembly illustrated in FIG. 3.
Figure 6B:
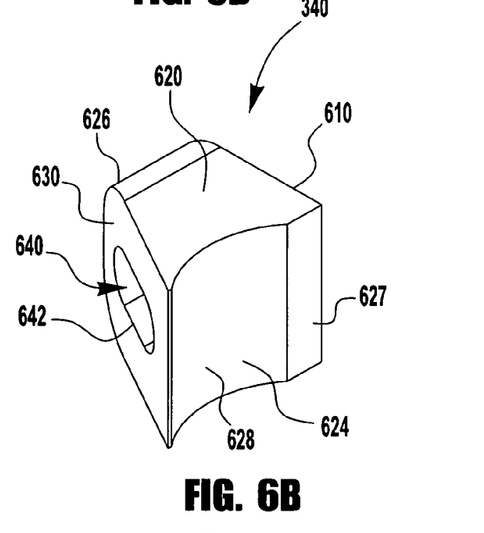
FIG. 6B is a top perspective view of the second wedge member of the embodiment of the mounting/adjustment assembly illustrated in FIG. 3.
Figure 6C:
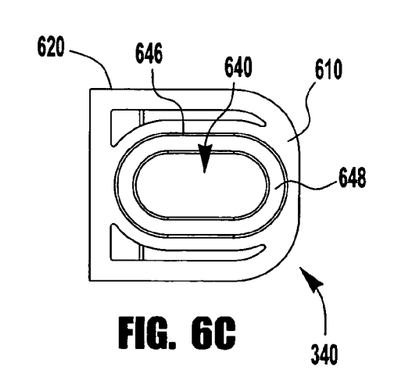
FIG. 6C is a side plan view of the second wedge member of the embodiment of the mounting/adjustment assembly illustrated in FIG. 3.
Figure 6D:
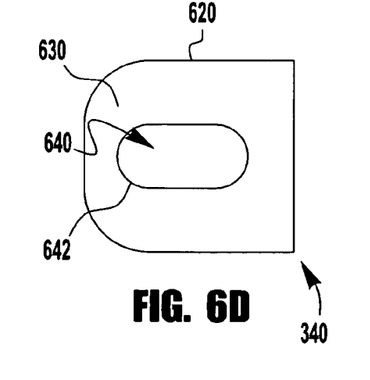
FIG. 6D is a top plan view of the second wedge member of the embodiment of the mounting/adjustment assembly illustrated in FIG. 3.

The frame bracket 300 of the embodiment illustrated in FIG. 4 includes an attachment portion 424 located between the upper and lower frame mounting portions 410, 412. The attachment portion 424 can take a variety of shapes and configurations. The attachment portion 424 of the embodiment of the frame bracket 300 illustrated in FIG. 4 is a generally planar, plate-like member. The frame bracket 300 of the embodiment illustrated in FIG. 4 is a unitary, one piece construction with the frame mounting portions 410, 412 and the attachment portion 424 of the frame bracket 300 being formed together as one piece. Additional embodiments of the frame bracket 300 are of multiple piece construction. It should also be understood that the frame bracket need not have distinct frame mounting portions and attachment portions. The frame bracket 300 can be any shape that partially surrounds the side cane 104 and provides for the attachment of additional parts. The frame bracket 300 of the embodiment illustrated in FIG. 4 is fashioned from metal, but other suitable materials such as plastic or a composite material could also be used.

The embodiment of the mounting/adjustment assembly 220 illustrated in FIG. 3 includes a first wedge member 330 and a second wedge member 340. An exemplary embodiment of the first wedge member 330 is shown in FIGS. 5A-5D and an exemplary embodiment of the second wedge member 340 is shown in FIGS. 6A-6D. The embodiment of the first wedge member 330 illustrated in FIGS. 5A-5D includes a bottom surface 510, a pair of side walls 520, a front wall 524, a back wall 526, and an inclined or angled top surface 530. The first wedge member 330 can take a variety of different shapes and configurations. The embodiment of the first wedge member 330 illustrated in FIGS. 5A-5D has a generally rectangular shape when viewed from the top, i.e. the top of FIG. 5A, with a pair of rounded corners. Additional embodiments of the first wedge member 330 do not include rounded corners. Examples of additional shapes for the first wedge member 330 include, but are not limited to, square, rectangular, semi-circular, triangular, etc.

The embodiment of the first wedge member 330 illustrated in FIGS. 5A-5D has a fastener channel 540 that extends from an opening 542 defined in the top surface 530 of the wedge through the height of the wedge to an opening 544 defined in the bottom surface 510 of the wedge. The fastener channel 540 could take a variety of shapes and configurations. The embodiment of the fastener channel 540 illustrated in FIGS. 5A-5D has a generally circular cross-section. Additional shapes for the shape of the cross section of the fastener channel 540 include, but are not limited to, oval, square, rectangular, triangular. The shape of the cross section of the fastener channel 540 could be any shape that allows a fastener to pass through the first wedge member 330. The fastener channel 540 of the embodiment illustrated in FIGS. 5A-5D has a sidewall 546.

The channel 540 of the embodiment illustrated in FIG. 5A-5D is a counter bored channel with the diameter of the opening 542 defined in the top surface 530 being smaller than the diameter of the opening 544 defined in the bottom surface 510. The counter boring of the channel 540 of the embodiment of the first wedge member 330 illustrated in FIG. 5A-5D forms a fastener seat 548 within the interior of the wedge. In an additional embodiment of the first wedge member 330, the channel 540 is not counter bored and no fastener seat 548 is provided. The embodiment of the first wedge member 330 illustrated in FIG. 5A-5D is partially hollow with empty spaces defined within the interior of the first wedge member 330 between the interior of the wedge side wall 520 and the exterior surface of the wall 546 of the fastener channel 540. In additional embodiments of the first wedge member 330, the wedge member is a solid construction without any void spaces in its interior. The first wedge member 330 of the embodiment illustrated in FIG. 5A-5D is fashioned from a composite material, but other suitable materials such as steel, aluminum, other metals, wood, plastic, etc. could also be used.

An exemplary embodiment of the second wedge member 340 is shown in FIGS. 6A-6D. The embodiment of the second wedge member 340 illustrated in FIGS. 6A-6D includes a bottom surface 610, a pair of side walls 620, a front wall 624, a back wall 626, and an inclined or angled top surface 630. The front wall 624 of the second wedge member 340 includes a generally planar surface 627 and a generally curved cane contacting surface 628. In additional embodiments of the second wedge member 340 the front wall 624 includes only a generally planar surface or only a curved cane contacting surface. The second wedge member 340 can take a variety of different shapes and configurations. The embodiment of the second wedge member 340 illustrated in FIGS. 6A-6D has a generally rectangular shape when viewed from the top, i.e. the top of FIG. 6A, with a pair of rounded corners. Additional embodiments of the second wedge member 340 do not include rounded corners. Examples of additional shapes for the second wedge member 340 include, but are not limited to, square, rectangular, semicircular, triangular, etc.

The embodiment of the second wedge member 340 illustrated in FIGS. 6A-6D has a fastener channel 640 that extends from an opening 642 defined in the top surface 630 of the wedge through the height of the wedge to an opening 644 defined in the bottom surface 610 of the wedge. The fastener channel 640 could take a variety of shapes and configurations. The embodiment of the second wedge member 340 illustrated in FIGS. 6A-6D has a fastener channel 640 with a "pill shaped" cross section, i.e. a generally rectangular shaped cross-section with rounded ends. Additional shapes for the shape of the cross section of the fastener channel 640 include, but are not limited to, elliptical, oval, circular, square, rectangular, triangular, etc. The shape of the cross section of the fastener channel 640 could be any shape that allows a fastener to pass through the second wedge member 640. The fastener channel 640 of the embodiment illustrated in FIGS. 6A-6D has a sidewall 646.

The channel 640 of the embodiment illustrated in FIGS. 6A-6D is a counter bored channel with the diameter of the opening 642 defined in the top surface 630 being smaller than the diameter of the opening 644 defined in the bottom surface 610. The counter boring of the channel 640 of the embodiment of the second wedge member 340 illustrated in FIGS. 6A-6D forms a fastener seat 648 within the interior of the wedge. In an additional embodiment of the second wedge member 340, the channel 640 is not counter bored and no fastener seat 648 is provided. The embodiment of the second wedge member 340 illustrated in FIGS. 6A-6D is partially hollow with empty spaces defined within the interior of the second wedge member 340 between the interior of the wedge side wall 620 and the exterior surface of the wall 646 of the fastener channel 640. In additional embodiments of the second wedge member 340, the wedge member is a solid construction without any void spaces in its interior. The second wedge member 340 of the embodiment illustrated in FIG. 3 is fashioned from a composite material, but other suitable materials such as steel, aluminum, other metals, wood, plastic, etc. could also be used.

With reference again to FIG. 4, a pair of upper fastener openings 450, 451 are defined in the upper frame mounting portion 410 and a pair of lower fastener openings 452, 453 are defined in the lower frame mounting portions 412. The fastener openings 450, 451, 452, 453 defined within the frame mounting portions 410, 412 of the frame bracket 300 can take a wide variety of shapes and configurations. The frame bracket 300 of this detailed description is not limited to this number of fastener openings and additional embodiments of the frame bracket 300 include different numbers of fastener openings. The fastener openings 450, 451, 452, and 453 of the frame bracket 300 of the embodiment illustrated in FIG. 4 include two square openings 451, 453 and two circular openings 450, 452. Additional embodiments of the frame bracket 300 include fastener openings 450, 451, 452, and 453 that are all square or all circular. Examples of additional shapes that can be used for the fastener openings include, but are not limited to, rectangular, triangular, elongated channels, etc.

A pair of fastener openings 454 are defined within the attachment portion 424 of the embodiment of the frame bracket 300 illustrated in FIG. 4. The fastener openings 454 defined within the frame bracket 300 can take a wide variety of shapes and configurations. The frame bracket 300 of this detailed description is not limited to a pair of fastener openings 454 and additional embodiments of the frame bracket 300 include different numbers of fastener openings. The fastener openings 454 defined within the embodiment of the frame bracket 300 illustrated in FIG. 4 are elongated channels. Additional embodiments of the frame bracket 300 include fastener openings that are not elongated channels. Examples of additional shapes that can be used for the fastener openings 454 include, but are not limited to, circular, rectangular, square, triangular, etc.

Figure 7:
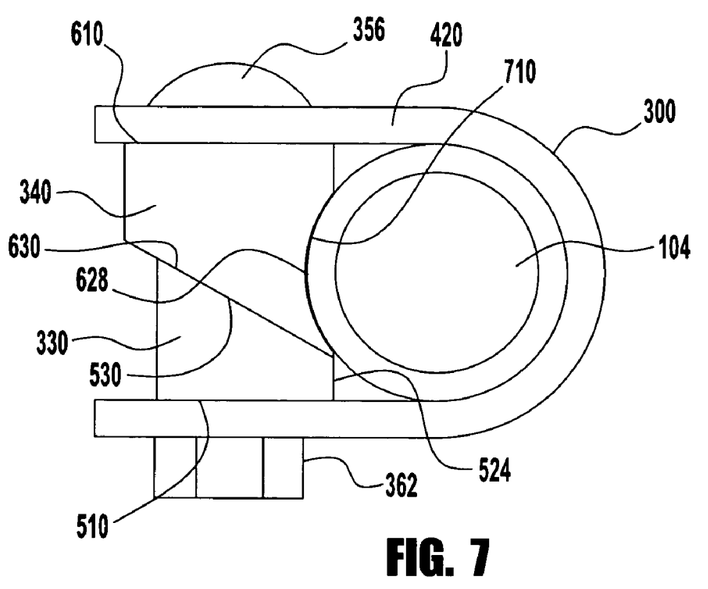
FIG. 7 is a top sectional magnified view illustrating the first wedge member and second wedge member of the mounting/adjustment assembly illustrated in FIG. 3 mounted onto a side cane.

With reference to FIGS. 3 and 4, the frame bracket 300 of the embodiment of the wheelchair seating assembly component 200 illustrated in FIG. 3 is clamped against the side cane 104 by the first wedge member 330 and second wedge member 340. To attach the frame bracket 300 of the embodiment illustrated in FIG. 3 to the side cane 104, the frame retaining portions 420, 422 of the frame bracket 300 are placed around the side cane 104 by a user or assembler. The first wedge member 330 and second wedge member 340 are placed within the two sides of the upper U-shaped frame retaining portion 420 of the upper frame mounting portion of the frame bracket 300, as illustrated in FIG. 7 with the cane contacting surface 624 of the second wedge member 340 contacting the surface 710 of the side cane 104; the front wall 524 of the first wedge member 330 facing toward the side cane 104; the bottom surface 510 of the first wedge member 330 and the bottom surface 610 of the second wedge member 340 contacting the interior surface of the frame retaining portion 420; and the inclined surfaces 530, 630 of the first and second wedge members 330, 340 contacting each other.

A fastener 356 is inserted through the fastener opening 451 (see FIG. 4) of the upper frame retaining portion 420 of the frame bracket 300, through the channels 540, 640 of the first and second wedge members 330, 340 and through the upper fastener opening 450 of the upper frame retaining portion 420. The fastener 356 can be a number of different kinds of fastener. The fastener 356 is a threaded carriage bolt with a domed head 358 and a square shaped shank portion 360 located on the shaft of the bolt below the bolt head 358. Examples of additional fasteners that can be used include, but are not limited to, conventional bolts, linch pins, screws, rivets, etc. The square shaped shank portion 360 of the fastener 356 fits within and engages the square shaped fastener opening 451 of the upper frame retaining portion 420 of the frame bracket 300 when the fastener 356 is inserted into the fastener opening 451. The engagement of the square shaped shank portion 360 of fastener 356 with the square fastener opening 451 prevents the rotation of the fastener 356 within the fastener opening 451.

The embodiment of the wheelchair seating assembly component 200 illustrated in FIG. 3 includes a nut 362 which is threaded onto fastener 356. Many different types of nuts can be used. The nut 362 in the embodiment of the wheelchair seating assembly component 200 illustrated in FIG. 3 is a barrel nut. Examples of other nuts that can be used include, but are not limited to, wing nuts, hex nuts, cap nuts, square nuts, jam nuts, lock nuts, etc. The nut 362 can be anything that can be tightened down onto the wedge members 330, 340. The barrel nut 362 of the embodiment of the wheelchair seating assembly component 200 illustrated in FIG. 3 includes a flange 364 and protruding boss 366 that is internally threaded.

As the barrel nut 362 is threaded onto the fastener 356, the protruding boss 366 of the barrel nut 362 fits through the circular fastener opening 450 in the upper frame mounting portion 410 until the flange 364 contacts the outer surface of the frame bracket 300. Only one tool is necessary to thread the barrel nut 362 of the embodiment illustrated in FIG. 3 onto the fastener 356, due to the fact that the shank portion 360 of the fastener 356 engages with the frame bracket 300 and prevents rotation of the fastener 356 relative to the frame bracket.

The barrel nut 362 of the embodiment of the wheelchair seating assembly component 200 illustrated in FIG. 3, engages the threads of the fastener 356 within the frame bracket, which makes it unnecessary for the threads of the fastener 356 to pass entirely through the frame bracket and be visible from the exterior of the frame bracket 300. This prevents the threads of the fastener 356 from being exposed outside the frame bracket 300, which gives the wheelchair seating assembly component 200 a clean, aesthetic appearance. This feature also makes the fastener 356 of the embodiment of the wheelchair seating assembly component 200 illustrated in FIG. 3 less likely to contact or catch on a wall or other surface during use of the wheelchair. As mentioned earlier, not all embodiments of the wheelchair seating assembly component 200 include such a barrel nut 362. It should also be understood that all embodiments of the wheelchair seating assembly component 200 do not include a nut either, as other fasteners other than nuts and bolts are used in additional embodiments of the assembly. The embodiment of the wheelchair seating assembly component 200 includes an optional washer 368 for placement between the nut 362 and the frame bracket 300. It should be understood that not all embodiments of the wheelchair seating assembly component 200 include such a washer 368.

As the nut 362 of the embodiment of the wheelchair seating assembly component 200 illustrated in FIG. 3 is tightened onto the fastener 356, the protruding boss 366 of the barrel nut 362 contacts the fastener seat 548 of the first wedge member 330. The recessed fastener seat 548 allows the protruding boss 366 of the fastener to be threaded on the threads of the fastener 356 within the frame bracket 300. Both the first and second wedge members 330, 340 of the embodiment illustrated in FIG. 3 include a recessed fastener seat 548, 648. This allows the boss 366 of the nut 362 to fit within either of the wedge members 330 340. This allows either of the wedges 330, 340 to be used on the side of the frame bracket that holds the fastener shank 360 or the nut 362 to increase the ease of assembly. It should be understood that additional embodiments of the first and second wedge members 330, 340 do not include recessed fastener seats.

As the nut 362 is tightened, it compresses the first wedge member 330 and second wedge member 340 together. The circular fastener channel 540 of the first wedge member 330 of the embodiment of the wheelchair seating assembly component 200 illustrated in FIG. 3 is adapted to fit relatively tightly around the boss 366 of the nut 362. When the barrel nut 362 is threaded onto the fastener 356, the fastener 356 and nut 362 of the illustrated embodiment have a common longitudinal axis. The engagement of the fastener channel 540 of the first wedge member 330 with the boss 366 of the nut 362 prevents the first wedge member 330 from moving in any direction other than along this longitudinal axis.

As the first wedge member 330 and second wedge member 340 are compressed together, the shape of the fastener channel 640 of the second wedge member 340 allows the second wedge member 340 to move relative to the fastener 356 both along the longitudinal axis of the fastener as well as in a direction transverse to the longitudinal axis. Due to the fact that the second wedge member 340 is capable of moving in a direction transverse to the longitudinal axis of the fastener 356 and the first wedge member 330 is not, the second wedge member 340 is urged forward towards the side cane 104 due to the orientation and engagement of the inclined surfaces 530, 630 of the first and second wedge members 330, 340 as the first and second wedge members 330, 340 are compressed together as the nut 362 is threaded onto the fastener 356 (as illustrated in FIG. 7).

As the nut 362 is threaded further down the fastener 356, the cane contacting surface 624 of the second wedge member 340 is clamped against the side cane 104. As the nut 362 is tightened further, the clamping force of the second wedge member 340 on the side cane 104 increases. The nut 362 is tightened by a user or assembler of the wheelchair 100 until the second wedge member 340 is clamped against the side cane with the sufficient tightness to clamp the frame bracket 300 securely onto the side cane 104. In additional embodiments of the wheelchair seating assembly component 200, both the first and second wedge members 330, 340 include fastener channels that are shaped to allow the wedge members 330, 340 to move along the longitudinal axis of the fastener 356 as well as in a direction transverse to the longitudinal axis of the fastener.

In the embodiment illustrated in FIG. 3, the mounting adjustment assemblies 220, 230 are adapted for use with cylindrical frame components having a diameter between ½ of an of an inch and 2 inches. One embodiment of the mounting adjustment assemblies 220 and 230 is adapted for use with cylindrical frame components having a diameter between ⅞ of an inch and 1 inch. However, it should be understood by those skilled in the art that additional embodiments of the mounting adjustment assemblies are adapted for use with cylindrical frame components having a wide range of diameter sizes. In addition, additional embodiments of the mounting adjustment assemblies 220 and 230 are adapted for use with frame components having non-circular cross sections.

The mounting/adjustment assemblies 220 and 230 of the embodiment of the wheelchair seating assembly component 200 illustrated in FIG. 3 each have an upper and lower pair of first and second wedge members 330, 340. Each of these pairs of wedge members of the mounting/adjustment assemblies 220, 230 are installed onto the side canes 104, 106 in the same manner as described above. As mentioned previously, additional embodiments of the wheelchair seating assembly component 200 include different numbers of mounting adjustment assemblies that each include different numbers of wedge members and the wheelchair seating assembly component 200 of this detailed description is not limited to two mounting/adjustment assemblies each having two pairs of wedge members.

Figure 8:
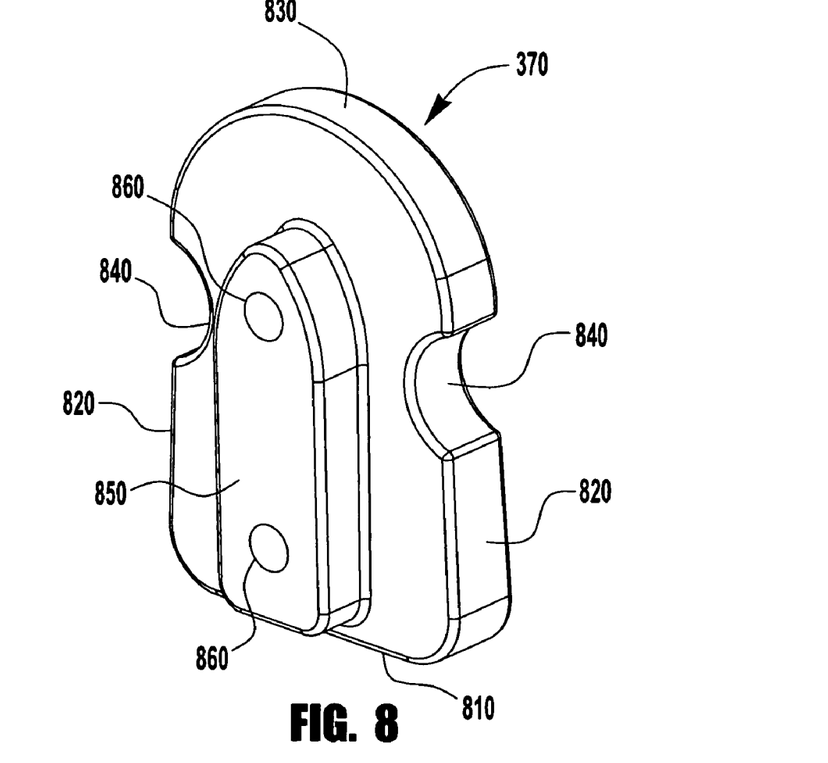
FIG. 8 is a perspective view of an attachment member of the embodiment of the mounting/adjustment assembly illustrated in FIG. 3.

The mounting/adjustment assemblies 220, 230 of the embodiment of the wheelchair seating assembly component 200 illustrated in FIG. 3 each include an attachment member 370. The attachment member can take many shapes and configurations. Referring to FIG. 8, an embodiment of the attachment member 370 is illustrated. The embodiment of the attachment member 370 illustrated in FIG. 8 is a generally planar plate like member with a bottom edge 810, two side edges 820 and a rounded top edge 830. Additional shapes that can be used for the attachment member 370 include, but are not limited to, rectangular, circular, triangular, elliptical, square, etc. The attachment member can be shaped and configured in any way that allows it to be mounted to the frame member and provide a quick connect attachment point for additional parts.

The embodiment of the attachment member 370 illustrated in FIG. 8 includes a notch 840 defined within each of the side edges 820. The notches 840 defined within the attachment member 370 can take a variety of different shapes and configurations. The notches 840 of the embodiment of the attachment member 370 illustrated in FIG. 8 have a semi-circular shape. Additional shapes that can be used for the notches 840 include, but are not limited to, square, rectangular, etc. The notches 840 can be any shape that allows for engagement with another part of the assembly.

The embodiment of the attachment member 820 illustrated in FIG. 8 includes a mounting portion 850 with a pair of fastener openings 860 defined within it. The mounting portion 850 and fastener openings 860 can take a variety of shapes and configurations. The mounting portion 850 of the embodiment of the attachment member 370 illustrated in FIG. 8 is a boss projecting from the surface of the attachment member 370. The mounting portion 850 can take any shape or configuration that will facilitate the mounting of the attachment plate 370 onto the frame bracket. The fastener openings 860 of the embodiment of the attachment member 370 illustrated in FIG. 8 are threaded holes defined within the mounting portion 850 of the attachment member 370. The threaded holes 860 defined within the embodiment of the attachment member 370 illustrated in FIG. 8 threadably engage with a pair of fasteners 384 that are passed through each of the pair of fastener openings 454 defined in the attachment portion 424 (see FIG. 4) of the frame bracket 300. The fasteners 384 of the embodiment of the wheelchair seating assembly component 200 illustrated in FIG. 8 are conventional bolts. The wheelchair seating assembly component 200 of the embodiment illustrated in FIG. 8 also includes an optional plate 386 which is located between the fasteners 384 and the frame bracket 300. The plate 386 is designed to ensure the fasteners 384 do not slip through the fastener openings 454 and to ensure that the fasteners 384 sufficiently clamp without distorting the frame bracket 300 which would hinder future adjustments. Additional embodiments of the wheelchair seating assembly component 200 do not include this plate 386.

It should be understood that additional types of fasteners are used in additional embodiments of the wheelchair seating assembly component 200. Examples of additional fasteners that can be used include, but are not limited to, any type of screws or bolts, anchors, rivets, cotterpins, clips, snaps, straps, ties, adhesives, weldments, etc. The shape and configuration of the fastener openings 860 in additional embodiments of the attachment member 370 depend on what type of fastener is used. In additional embodiments of the wheelchair seating assembly component 200 the attachment plate is mounted permanently to the frame bracket 300 or is formed integrally with the frame bracket 300.

After the frame bracket 300 of the embodiment of the wheelchair seating assembly component 200 illustrated in FIG. 3 is attached to the side cane 104, the attachment member 370 is mounted onto the frame bracket 300 using the fasteners 384. The pair of fasteners 384 pass through the optional plate 386 and through the pair of fastener openings 454 defined within the attachment portion 424 of the frame bracket and threadably engage with the fastener openings 860 defined within the mounting portion 850 of the attachment member 370. The elongated channel fastener openings 454 of the attachment portion 424 of the frame bracket 300 allow for adjustment of the location of the attachment member 370 relative to the side cane 104. The attachment member 370 can be moved along these elongated channels 454 to a position that is desired by a user or assembler of the wheelchair before the fasteners 384 are tightened.

The elongated channels 454 also allow the angle of the attachment member 370 relative to the side cane 104 to be adjusted as well. The height of each of the elongated channels 454 of the frame bracket 300 of the embodiment illustrated in FIG. 4 is larger than the diameter of the fasteners 384. The fasteners 384 of the embodiment of the wheelchair seating assembly component 200 illustrated in FIG. 3 would slip through the elongated channels 454 if not for the plate 386. The sizing difference between the height of the elongated channels 454 and the diameter of the fasteners 384 allows for the fasteners 384 to each be moved within the elongated channels 454 to different locations relative to the side cane 104 (for example, one of the fasteners 384 could be located in one of the elongated channels 454 at a distance "x" from the side cane 102 and one of the fasteners 384 could be located in the other elongated channels 454 at a distance from the side cane 104 that is different than "x"). The fact that each of the fasteners 384 can be moved to different locations within the elongated channels 454 relative to the side cane 104 and then tightened allows the angular orientation of the backrest relative to the side cane 104 to be adjusted.

It should be understood by those skilled in the art that this angular adjustment feature could also be accomplished in other ways. For example, in additional embodiments only one of the channels 354 is enlarged in comparison to the diameter of the fasteners 384 while the other channel is not. As mentioned previously, the plate 386 is not included with all embodiments of the wheelchair seating assembly component 200 and additional embodiments of the wheelchair seating assembly component may also have elongated channels 454 sized to prevent the fasteners 384 from passing through the elongated channels 454.

Referring again to FIG. 2, the embodiment of the wheelchair seating assembly component 200 includes a backrest 210. The backrest 210 of the embodiment of the wheelchair seating assembly component 200 illustrated in FIG. 2 includes a pair of latching assemblies 240, 250. The latching assemblies 240, 250 are mirror constructions of each other and, therefore, only latching assembly 240 will be discussed in particular. It should be understood that additional embodiments of the wheelchair seating assembly component 200 include more or less than two latching assemblies and the wheelchair seating assembly component of this detailed description is not limited to a pair of latching assemblies.

As mentioned previously, the wheelchair seating assembly component 200 of the embodiment illustrated in FIG. 2 generally includes a pair of latching assemblies 240, 250 for the attachment of the backrest 210 to the mounting/adjustment assemblies 220, 230 that are mounted onto the side canes 104, 106. The latching assemblies 240, 250 of the embodiment of the wheelchair seating assembly component 200 illustrated in FIG. 2 thereby provide for the selective attachment and removal of the backrest 210 to and from the side canes 104, 106.

Figure 9A:
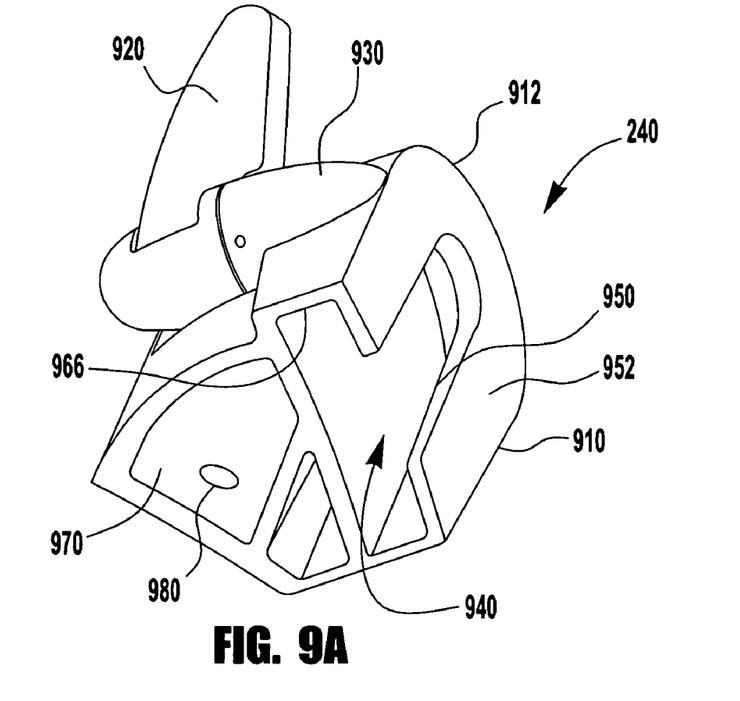
FIG. 9A is a perspective view of a latching assembly of the embodiment of the seating assembly component illustrated in FIG. 2.
Figure 9B:
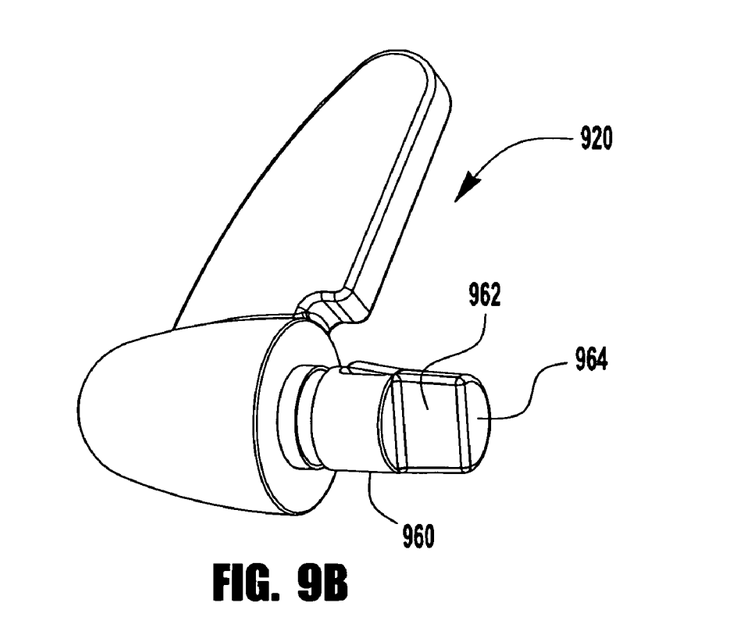
FIG. 9B is a perspective view of the latching control of the latching assembly illustrated in FIG. 9A.

As shown in FIGS. 9A-9B, the latching assembly 240 includes a main body 910. The main body 910 can take a variety of shapes and configurations. The main body 910 of the embodiment of the latching assembly 240 illustrated in FIG. 2 has a generally rectangular shape when viewed from the side, i.e. the right or left of FIG. 2, with a rounded top 912. Any number of shapes can be used for the main body of the latching assembly 240 in additional embodiments of the latching assembly. As shown in FIGS. 9A-9B, the embodiment of the latching assembly 240 illustrated in FIGS. 9A-9B includes a latching control 920. The latching control 920 can take a variety of shapes and configurations. The latching control 920 of the embodiment of the latching assembly 240 illustrated in FIG. 2 is a lever which is mounted within a latching control mount 930 formed within the main body 910 of the latching assembly 240. The latching control 920 is mounted within the latching control mount 930 for pivotal movement relative to the main body 10 of the latching assembly 240 between a first and second position. Examples of items that are used for the latching control 920 in additional embodiments of the latching assembly are buttons, sliders, dials, tabs, plungers, etc. The latching control 920 can be any mechanism or item that allows the latching member 240 to be selectively latched or unlatched.

The embodiment of the latching assembly 240 illustrated in FIGS. 9A-9B includes an attachment member receiving channel 940 defined within the main body 910 of the latching member 240. The attachment member receiving channel 940 can take a variety of shapes and configurations. The attachment member receiving channel 940 of the embodiment of the latching assembly 240 illustrated in FIGS. 9A-9B has a generally rectangular cross section when viewed from the bottom, i.e. the bottom of FIG. 9A. Examples of additional cross sectional shapes that can be used for the attachment member receiving channel 940 include, but are not limited to, circular, triangular, square, irregular shaped, etc. The embodiment of the latching assembly 240 illustrated in FIGS. 9A-9B includes a slot 950 defined within a side wall 952 of the main body 910 of the latching assembly 240. The slot 950 opens into the attachment member receiving channel 940 defined within the main body 910 of the embodiment of the latching assembly 240 illustrated in FIGS. 9A-9B. The slot 950 can take a variety of shape and configurations. The slot 950 of the embodiment of the latching assembly 240 has a generally rectangular shape with a rounded end. Examples of additional shapes that can be used for the slot 950 include, but are not limited to, rectangular, semi-circular, etc.

The latching control 920 of the embodiment of the latching assembly 240 illustrated in FIGS. 9A-9B includes a projection 960 that is mounted within the main body 910 of the latching assembly 240 and is in physical communication with the attachment member receiving channel 940. The projection 960 of the embodiment of the latching assembly 240 illustrated in FIGS. 9A-9B can take a variety of shapes and configurations. The projection 960 of the latching control 920 of the embodiment of the latching assembly 240 illustrated in FIGS. 9A-9B has a circular shaped cross section with a notch 962 defined within the end 964 of the projection 960 giving the end 964 of the projection 960 a semi-circular shaped cross section. Examples of additional shapes that can be used for the shape of the cross section of the projection 960 include, but are not limited to, square, rectangular, elliptical, etc. When the latching control 920 of the latching assembly 240 illustrated in FIGS. 9A-9B is in the first or unlatched position, the notch 962 defined within the projection 960 of the latching control 920 is adapted to be flush with the side wall 966 of the attachment member receiving channel 940 as shown in FIGS. 9A-9B. When the latching control 920 of the latching assembly 240 illustrated in FIGS. 9A-9B is in the second or latched position, the semi-circular shaped end 966 of the projection 960 of the latching control 920 projects into the attachment member receiving channel 940 of the latching assembly 240 as shown in FIGS. 9A-9B.

The embodiment of the latching assembly 240 illustrated in FIGS. 9A-B includes a mounting portion 970. The mounting portion 970 can take a variety of shapes and configurations. The mounting portion 970 of the latching assembly 240 illustrated in FIGS. 9A-9B includes a plurality of fastener openings 980. The embodiment of the latching assembly 240 illustrated in FIG. 2 is mounted onto the shell 260 of the backrest 210 by fasteners. The fasteners _90 of the embodiment of the latching assembly illustrated in FIGS. 9A-9B can be a variety of different fasteners. Examples of fasteners that can be used include, but are not limited to, any type of screws or bolts, anchors, rivets, cotterpins, clips, snaps, straps, ties, adhesives, weldments, etc. It should also be understood that in additional embodiments of the wheelchair seating assembly component 200 the latching assembly 240 is formed integrally with the backrest 210 as a unitary, one-piece construction.

After the mounting/adjustment assemblies 220, 230, along with the attachment members 370 of the mounting/adjustment assemblies 220, 230, are attached to the side canes 104, 106 as described herein, the attachment member receiving channels 940 of the latching assemblies 240, 250 of the backrest 210 are slid downward onto the attachment members 370 of the latching assemblies 220, 230 with the latching control 920 of the latching assemblies in the first or unlatched position. Because the notch 962 defined within the end 964 of the projection 960 of the latching control 920 of the latching assembly 240 is flush with the side wall 966 of the attachment member receiving channels 940 of the latching assembly 240, the attachment members 370 of the embodiment of the wheelchair seating assembly component 200 illustrated in FIG. 3 slide fully within the attachment member receiving channels 940.

To retain the backrest 210 of the embodiment of the wheelchair seating assembly component 220 illustrated in FIG. 3 on the mounting/adjustment assemblies, the latching control 920 of the latching assemblies 240, 250 are moved to the second or latched position by a user or assembler of the wheelchair. When in the second or latched position, the end 964 of the latching control 920 projects into the attachment member receiving channel 940 of the latching assemblies 240 and 250 and fits within one of the notches 840 defined within the side edges 820 of the attachment members 370 of the mounting/adjustment assemblies 220, 230. The engagement of the end 964 of the latching control 920 with the notches 840 of the attachment members 370 prevents the attachment members 370 from sliding out of the latching assemblies 240, 250 thereby retaining the backrest 210 onto the mounting/adjustment assemblies 230, 240 and consequently the side canes 104, 106 of the wheelchair.

Once the embodiment of the backrest 210 illustrated in FIG. 3 is mounted onto the side canes 104, 106 of the wheelchair, the location of the backrest 210 relative to the side canes 104, 106 can be adjusted. The relative height of the backrest, or the vertical location of the embodiment of the backrest 210 illustrated in FIG. 3 on the side canes 104, 106 can be adjusted by loosening or un-clamping the first and second wedge members 330, 340 of the mounting/adjustment assemblies 220, 230 from the side canes 104, 106 and tightening or re-clamping the wedge members 330, 340 onto the side canes 104, 106 at a different vertical location on the side canes 104, 106.

The horizontal position (or distance from the side canes 104, 106) of the embodiment of the backrest 210 illustrated in FIG. 3 can be adjusted between an aft and a fore position by loosening the fasteners 384 which attach the attachment members 370 of the mounting/adjustment assemblies 220, 230 to the frame brackets 300, moving the backrest 210 relative to the side canes 104, 106 until the backrest 210 is in the desired horizontal position and then tightening the fasteners 384 against the frame bracket 300. Similarly, the angular orientation of the backrest 210 relative to the side canes 104, 106 can also be adjusted by loosening the fasteners 384 which attach the attachment members 370 of the mounting/adjustment assemblies 220, 230 to the frame brackets 300, moving the backrest 210 relative to the side canes 104, 106 until the backrest 210 is in the desired angular position and then tightening the fasteners 384 against the frame bracket 300.

Figure 10:
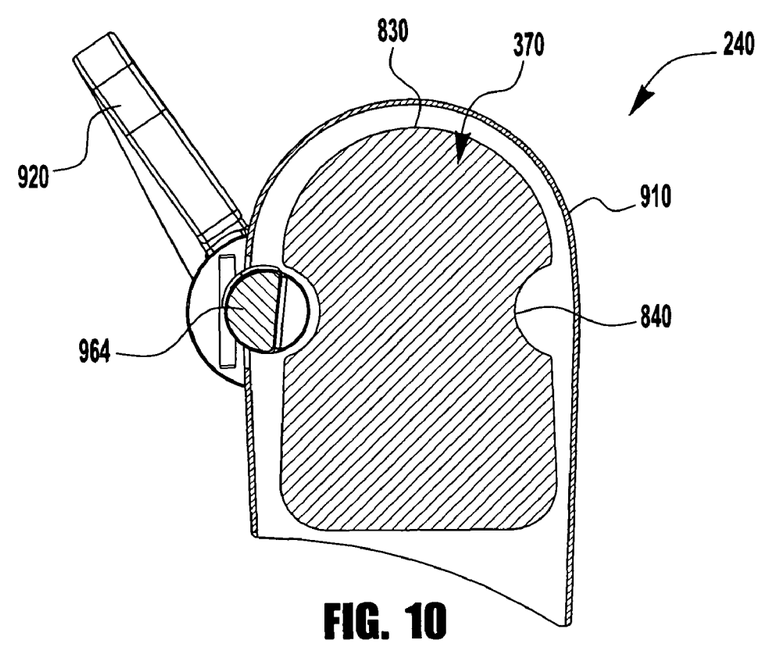
FIG. 10 is a sectional view of the latching assembly of the embodiment of the seating assembly component illustrated in FIG. 2 with the latching control in the unlatched position.
Figure 11:
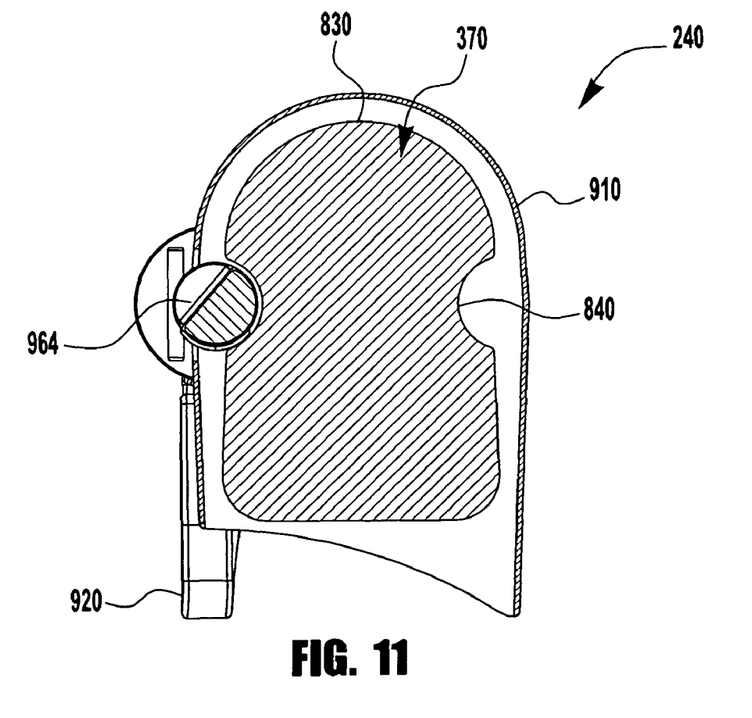
FIG. 11 is a sectional view of the latching assembly of the embodiment of the seating assembly component illustrated in FIG. 2 with the latching control in the latched position.

The embodiment of the wheelchair seating assembly component 200 illustrated in FIG. 3 also provides for the removal of the backrest 210 from the side canes 104, 106. The backrest 210 of the wheelchair seating assembly component 200 can be removed from the side canes 104, 106 by moving the latching controls 920 of the latching assemblies 240, 250 to an unlatched position (see FIG. 10). When the latching controls 920 are in the unlatched position, the backrest 210 can be freely removed from the mounting/adjustment assemblies 220, 230 and consequently the side canes 104, 106. The backrest 210 of the embodiment of the wheelchair seating assembly component 200 illustrated in FIG. 3 can be re-installed on the side canes by sliding the latching assemblies 240, 250 onto the mounting/adjustment assemblies 220, 230 and moving the latching controls 920 to the latched position (see FIG. 11).

It should be apparent to one skilled in the art that the wedge members 330 and 340 could have various size, shapes and orientations and could be attached to the frame bracket 300 and the side canes 104, 106 in different locations and by different methods. The shape and orientation of the wedge members 330, 340 allows them to grip items of various sizes, shapes and orientation. In addition to creating a tight clamping force on the side canes 104, 106 of the wheelchair seating assembly component 200 illustrated in FIG. 3, the wedge members 330, 340 are also capable of working over a larger tolerance range. The wedge members 330, 340 of the embodiment of the wheelchair seating assembly component 200 illustrated in FIG. 3 are adapted for use with cylindrical frame components having a diameter between ½ of an of an inch and 2 inches. One embodiment of the wedge members 330, 340 is adapted for use with cylindrical frame components having a diameter between ⅞ of an inch and 1 inch. While the wedge members 330, 340 of the embodiment of the wheelchair seating assembly component 200 illustrated in FIG. 3 are useable within this range, it should also be understood that they are designed to be useable and adequately clamp frame components that an outer diameter outside of this range to allow for variances in the exact diameter of such frame components. It should be understood that the wedge members 330, 340 of additional embodiments are adapted to work with a wide range of tubular items as well as non cylindrically shaped items.

In addition, the wedge members 330, 340 of the embodiment of the wheelchair seating assembly component 200 illustrated in FIG. 3 can also clamp onto items which have non-circular cross-sectional shapes. For example, the wedge members 330, 340 of the wheelchair seating assembly component 200 illustrated in FIG. 3 can be used to clamp items that have an oval, elliptical, rectangular, square, triangular, irregular or other cross-sectional shape. It should be understood by those skilled in the art that the wedge members 330, 340 are not limited to being used in conjunction with wheelchair backrests but could also be used in conjunction with the seat bottom, armrest, legrests or other portions of a wheelchair. It should also be understood that the wedge members 330, 340 are not limited to use with wheelchairs but could be used with any application that requires the clamping of a part or item.

The mounting/adjustment assembly 220, 230 of the embodiment of the wheelchair seating assembly component 200 illustrated in FIG. 3 eliminate the need for different hardware for installing the backrest 210 onto side canes 104, 106 that have different diameters or different cross-sectional shapes. Some wheelchairs have a combination of differently sized and shaped frame components which the mounting/adjustment assemblies 220, 230 of the embodiment of the wheelchair seating assembly component 200 illustrated in FIG. 3 would be able to accommodate without modification. The mounting/adjustment assemblies 220, 230 of the wheelchair seating assembly component 200 illustrated in FIG. 3 requires only one tool to make all adjustments to fit the backrest 210 to the side canes 104, 106 of the wheelchair and to subsequently adjust the backrest 210. The embodiment of the wheelchair seating assembly component 200 illustrated in FIG. 3 helps to reduce the time to install and subsequently adjust the backrest 210. It should also be noted that the backrest 210 of the embodiment of the wheelchair seating assembly component 200 illustrated in FIG. 3 of this detailed description could be assembled to the side canes 104, 106 prior to its sale to an end user or it could be assembled to the frame 102 by an end user or the end user's physician.

Figure 12:
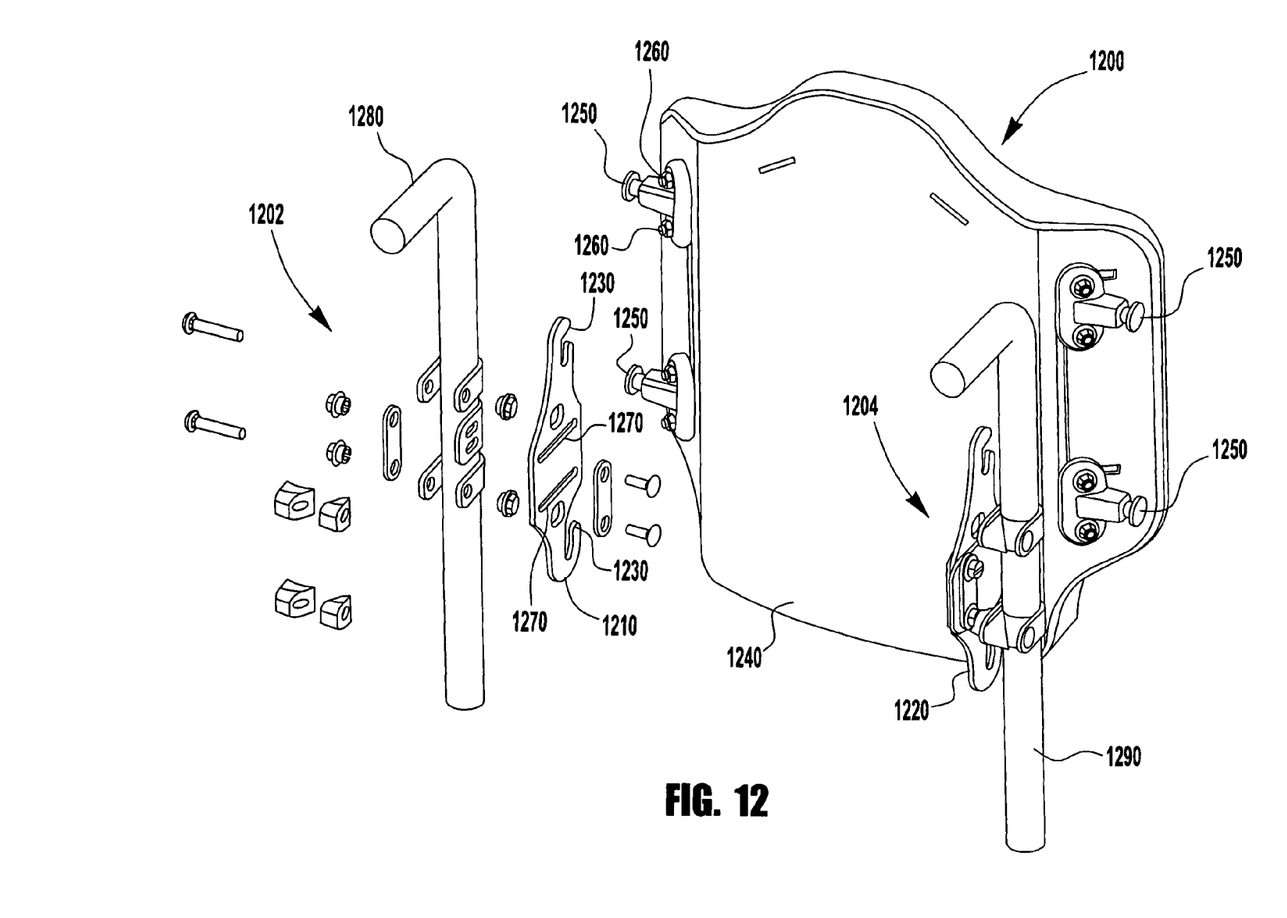
FIG. 12 is a perspective view of a second embodiment of a seating assembly component.

Referring now to FIG. 12, a second embodiment of the wheelchair seating assembly component 1200 of this detailed description is shown. The mounting/adjustment assemblies 1202, 1204 of the embodiment of the wheelchair seating assembly component 1200 illustrated in FIG. 12 include attachment members 1210, 1220. The attachment members 1210, 1220 of the embodiment of the wheelchair seating assembly component 1200 illustrated in FIG. 12 include upper and lower hooks 1230. The backrest 1240 of the wheelchair seating assembly component includes mounting posts 1250. The mounting posts of the embodiment of the wheelchair seating assembly component 125000 illustrated in FIG. 12 are attached to the backrest 1240 by a plurality of fasteners 1260. The fasteners 1260 of the embodiment of the wheelchair seating assembly component 1200 illustrated in FIG. 12 are conventional screws. Examples of additional fasteners that can be used include, but are not limited to, any type of screws or bolts, anchors, rivets, cotterpins, clips, snaps, straps, ties, adhesives, weldments, etc.

The mounting posts 1250 of the backrest 1240 of the embodiment of the wheelchair seating assembly component 1200 illustrated in FIG. 12 attach to the hooks 1230 of the attachment members. The backrest 1240 of the embodiment of the wheelchair seating assembly component 1200 illustrated in FIG. 12 can be removed from the side canes by removing the hooks 1230 of the attachment members 1210, 1220. The attachment members 1210,1220 of the wheelchair seating assembly component 1200 illustrated in FIG. 12 include a pair of fastener channels 1270 which provide for the adjustment of the horizontal location of the backrest 1240 (i.e. the distance of the backrest 1240 from the side canes 1280, 1290) and the angular position of the backrest 1240 relative to the side canes 1280, 1290 similarly to the embodiment of the wheelchair seating assembly component 200 illustrated in FIG. 3.

It should be noted that for the purposes of this application, the terms attach (attached) and mount (mounted) are not limited to direct attachment or mounting but also include indirect attachment or mounting with intermediate parts, components or assemblies being located between the two parts being mounted or attached to one another. It should be noted that the wheelchair seating assembly component 200 of this detailed description can be a removable seating assembly component and/or an adjustable seating assembly component. It should also be understood that the embodiments discussed above are representative of aspects of the invention and are provided as examples and not an exhaustive description of implementations of an aspect of the invention.

While various aspects of the invention are described and illustrated herein as embodied in combination in the exemplary embodiments, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated.

The invention claimed is:

1. A wheelchair comprising:
a frame;
a plurality of wheels that are adapted to support the frame relative to a supporting surface;
a seat component for supporting an occupant, the seat component including at least one of a seat bottom and a backrest; and
at least one mounting assembly for mounting the seat component onto the frame, the at least one mounting assembly comprising:
a bracket that partially surrounds a portion of the frame, wherein the bracket comprises a first portion and a second portion, each portion extending away from the frame when the at least one mounting assembly is mounted to the frame;
a first wedge member comprising a bracket contacting surface and having an inclined surface;
a second wedge member comprising a bracket contacting surface, having an inclined surface, and a frame contacting surface;
a fastener for attaching the first and second wedge members to the bracket, the fastener comprising one or more bracket contacting surfaces; and
wherein the inclined surface of the first wedge member contacts the inclined surface of the second wedge member when the wedge members are mounted to the bracket.

2. The wheelchair of claim 1 wherein the fastener exerts an increasing compressive force on the first and second wedge members as the fastener is tightened; wherein as the compressive force exerted on the first and second wedge member is increased, the frame contacting surface of the second wedge member is pressed against a portion of the frame, the pressing of the second wedge member against the portion of the frame retains the at least one mounting assembly on the frame; and wherein a portion of the seat component is attached to the at least one mounting assembly.

3. The wheelchair of claim 2, wherein the fastener has a longitudinal axis and the first portion of the bracket prohibits movement of the second wedge member along the longitudinal axis of the fastener as the fastener is tightened.

4. The wheelchair of claim 3, wherein the first wedge member comprises a fastener channel shaped and configured to prohibit movement of the first wedge member in a direction transverse to the longitudinal axis of the fastener when the fastener is tightened.

5. The wheelchair of claim 4, wherein the second wedge member comprises a fastener channel shaped on configured to permit movement of the second wedge member in a direction transverse to the longitudinal axis of the fastener when the fastener is tightened.

6. The wheelchair of claim 2, wherein the fastener has a longitudinal axis and the first portion of the bracket prohibits movement of the first wedge member along the longitudinal axis of the fastener as the fastener is tightened.

7. The wheelchair of claim 1 wherein the fastener includes a nut which has a protruding boss, and wherein the protruding boss of the nut is accepted within a recessed fastener seat defined within at least one of the first or second wedge members.

8. The wheelchair of claim 1 wherein a fastener channel is defined within the first and second wedge members, the fastener channel being adapted to allow the fastener to pass through the first and second wedge members;

wherein the fastener has a longitudinal axis; and wherein the fastener channel defined through at least one of the first or second wedge members is adapted to allow for movement of the wedge member both along the longitudinal axis of the fastener and in a direction transverse to the longitudinal axis of the fastener.

9. The wheelchair of claim 1 wherein a fastener channel is defined within the first and second wedge members, the fastener channel being adapted to allow the fastener to pass through the first and second wedge members;

wherein the fastener has a longitudinal axis; and wherein the fastener channel defined through at least one of the first or second wedge members is adapted to allow for movement of the wedge member only along the longitudinal axis of the fastener.

10. The wheelchair of claim 1 wherein the frame contacting surface of the second wedge member has a generally curved profile.

11. The wheelchair of claim 1 wherein the seat component further comprises a latching assembly for attaching the seat component to the at least one mounting assembly.

12. The wheelchair of claim 11 wherein the at least one mounting assembly includes an attachment member, and wherein the latching assembly selectively engages with the attachment member of the at least one mounting assembly for attaching the seat component to the at least one mounting assembly.

13. The wheelchair of claim 1, wherein the fastener comprises a head portion, a thread portion, and a nut configured to be threaded onto the thread portion, and wherein the head portion of the fastener acts on the first portion of the bracket when the at least one mounting assembly is mounted to the frame and the nut acts on the second portion of the bracket when the at least one mounting assembly is mounted to the frame.

14. The wheelchair of claim 13, wherein the fastener comprises a shank configured to mate with an opening in the first portion of the bracket to prohibit rotation of the fastener relative to the bracket when the at least one mounting assembly is mounted to the frame.

15. The wheelchair of claim 1, wherein the fastener comprises a head portion and a nut, the head portion and the nut each having a bracket contacting surface, and wherein the bracket contacting surfaces of the first wedge member and the nut contact opposing sides of the second portion of the bracket when the at least one mounting assembly is mounted to the frame, and wherein the bracket contacting surfaces of the second wedge member and the head portion contact opposing sides of the first portion of the bracket when the at least one mounting assembly is mounted to the frame.

16. A seating assembly for use with a wheelchair comprising:

a seat component, the seat component including at least one of a seat bottom and a backrest;

a frame; and at least one mounting assembly attached to a portion of the seat component for mounting the seat component onto the frame, the at least one mounting assembly comprising:

a bracket that partially surrounds a portion of the frame, wherein the bracket comprises a first portion and a second portion, each portion extending away from the frame when the at least one mounting assembly is mounted to the frame;

a first wedge member comprising a bracket contacting surface and having an inclined surface;

a second wedge member comprising a bracket contacting surface, having an inclined surface, and a frame contacting surface;

a fastener for attaching the first and second wedge members to the bracket, the fastener comprising one or more bracket contacting surfaces; and wherein the inclined surface of the first wedge member faces toward the inclined surface of the second wedge member when the wedge members are mounted to the bracket, and wherein the fastener exerts an increasing compressive force on the first and second wedge members as the fastener is tightened;

wherein as the compressive force exerted on the first and second wedge member is increased, the frame contacting surface of the second wedge member is pressed against a portion of the frame, the pressing of the second wedge member against the portion of the frame retains the at least one mounting assembly on the frame.

17. The seating assembly of claim 16 wherein the fastener includes a nut which has a protruding boss, and wherein the protruding boss of the nut is accepted within a recessed fastener seat defined within at least one of the first or second wedge members.

18. The seating assembly of claim 16 wherein a fastener channel is defined within the first and second wedge members, the fastener channel being adapted to allow the fastener to pass through the first and second wedge members;

wherein the fastener has a longitudinal axis; and wherein the fastener channel defined through at least one of the first or second wedge members is adapted to allow for movement of the wedge member both along the longitudinal axis of the fastener and in a direction transverse to the longitudinal axis of the fastener.

19. The seating assembly of claim 16 wherein a fastener channel is defined within the first and second wedge members, the fastener channel being adapted to allow the fastener to pass through the first and second wedge members;

wherein the fastener has a longitudinal axis; and wherein the fastener channel defined through at least one of the first or second wedge members is adapted to allow for movement of the wedge member only along the longitudinal axis of the fastener.

20. The seating assembly of claim 16 wherein the frame contacting surface of the second wedge member has a generally curved profile.

21. The seating assembly of claim 16 wherein the seat component further comprises a latching assembly for attaching the seat component to the at least one mounting assembly.

22. The seating assembly of claim 21 wherein the at least one mounting assembly includes an attachment member, and wherein the latching assembly selectively engages with the attachment member of the at least one mounting assembly for attaching the seat component to the at least one mounting assembly.

23. A clamping device, the clamping device comprising:

a bracket that partially surrounds a component, wherein the bracket comprises a first portion and a second portion, each portion extending away from the component when the clamping device is mounted to the component;

a first wedge member comprising a bracket contacting surface and an inclined surface;

a second wedge member comprising a bracket contacting surface, an inclined surface, and a component contacting surface; and a fastener for attaching the first and second wedge members to the bracket, the fastener comprising one or more bracket contacting surfaces;

wherein the inclined surface of the first wedge member contacts the inclined surface of the second wedge member when the wedge members are mounted to the bracket, and wherein the fastener exerts an increasing compressive force on the first and second wedge members as the fastener is tightened;

wherein as the compressive force exerted on the first and second wedge member is increased, the component contacting surface of the second wedge member is pressed against a portion of the component, the pressing of the second wedge member against the portion of the component retaining the clamping device onto the component;

wherein a fastener channel is defined within the first and second wedge members, the fastener channel being adapted to allow the fastener to pass through the first and second wedge members;

wherein the fastener has a longitudinal axis; and wherein the fastener channel defined through at least one of the first or second wedge members is adapted to allow for movement of the wedge member only along the longitudinal axis of the fastener.

24. The clamping device of claim 23 wherein the fastener includes a nut which has a protruding boss, and wherein the protruding boss of the nut is accepted within a recessed fastener seat defined within at least one of the first or second wedge members.

25. The clamping device of claim 23 wherein the fastener channel defined through at least one of the first or second wedge members is adapted to allow for movement of the wedge member both along the longitudinal axis of the fastener and in a direction transverse to the longitudinal axis of the fastener.

26. The clamping device of claim 23 wherein the component contacting surface of the second wedge member has a generally curved profile.

27. A seating assembly for use with a wheelchair comprising:

a seat component, the seat component including at least one of a seat bottom and a backrest;

a frame;

at least one mounting assembly attached to a portion of the seat component for mounting the seat component onto the frame, the at least one mounting assembly comprising:

a bracket that partially surrounds a portion of the frame, wherein the bracket comprises a first portion and a second portion, each portion extending away from the frame when the at least one mounting assembly is mounted to the frame;

a first wedge member comprising a bracket contacting surface and an inclined surface;

a second wedge member comprising a bracket contacting surface, an inclined surface, and a frame contacting surface;

a fastener for attaching the first and second wedge members to the bracket, the fastener comprising one or more bracket contacting surfaces, and wherein the inclined surface of the first wedge member faces toward the inclined surface of the second wedge member when the wedge members are mounted to the bracket, and wherein the fastener exerts an increasing compressive force on the first and second wedge members as the fastener is tightened;

wherein as the compressive force exerted on the first and second wedge member is increased, the frame contacting surface of the second wedge member is pressed against a portion of the frame, the pressing of the second wedge member against the portion of the frame retains the at least one mounting assembly on the frame; and a latching assembly for attaching the portion of the seat component to the at least one mounting assembly, wherein the at least one mounting assembly includes an attachment member, and wherein the latching assembly includes a body configured to slide over and at least partially surround a portion of the attachment member and a latching control configured to selectively engage the attachment member for retaining the portion of the seat component to the at least one mounting assembly.

* * * * *